(12) United States Patent
Keppel et al.

(10) Patent No.: US 6,513,110 B1
(45) Date of Patent: Jan. 28, 2003

(54) CHECK INSTRUCTION AND METHOD

(75) Inventors: David Keppel, Seattle, WA (US); Paul S. Serris, Sunnyvale, CA (US); Godfrey D'Souza, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/464,644

(22) Filed: Dec. 15, 1999

(51) Int. Cl.$^7$ ............................... G06F 11/36
(52) U.S. Cl. ......................... 712/227; 714/35
(58) Field of Search ........................ 712/227; 714/35

(56) References Cited

U.S. PATENT DOCUMENTS

| | | | | |
|---|---|---|---|---|
| 4,439,828 A | * | 3/1984 | Martin ........................ | 712/226 |
| 4,679,194 A | * | 7/1987 | Peters et al. .................. | 712/227 |
| 5,414,853 A | * | 5/1995 | Fertig et al. .................. | 717/106 |
| 5,475,852 A | * | 12/1995 | Yoshida et al. .............. | 712/227 |
| 5,748,951 A | * | 5/1998 | Webb et al. .................. | 712/245 |
| 5,790,844 A | * | 8/1998 | Webb et al. .................. | 712/227 |
| 6,058,420 A | * | 5/2000 | Webb et al. .................. | 712/208 |
| 6,336,212 B1 | * | 1/2002 | Gray et al. .................. | 712/227 |

* cited by examiner

Primary Examiner—William M. Treat
(74) Attorney, Agent, or Firm—Wagner Murabito & Hao LLP

(57) ABSTRACT

Processing exceptions that might occur upon the processor's execution of an instruction (13), such as a load or store instruction, may be anticipated and resolved in advance of execution of the instruction by first executing a check instruction (1) that mimics the aforementioned instruction in all material respects, except that the check instruction excludes and is unable to perform the final operation prescribed by the mimicked instruction. A variety of those check instructions are provided to respectively mimic the multiple types of loads and stores (and other operations) normally occurring in processing of computer instructions. The check instructions are particularly useful to check instructions that call for input-output operations.

13 Claims, 1 Drawing Sheet

CHECK INSTRUCTION AND METHOD

FIELD OF THE INVENTION

The present invention relates to digital computers, and, more particularly, to a software technique for verifying that execution of an instruction will not produce an unrecoverable processor error.

BACKGROUND

Processors function by executing instructions. Sometimes an instruction cannot be carried out for any of a variety of possible reasons and generates an exception. For example, a memory page at which an instruction resides may not be in main memory and must be paged in before the instruction can execute, or an instruction might not have permission to store to a specific address. When such an exception occurs, further processing of the instruction is temporarily halted, until the exception is resolved. Resolution is accomplished with an exception handler, a software routine specifically designed to deal with such exceptions. A processor typically contains different exception handlers to handle each kind of exception that might occur. Typically those software routines handle and resolve the exception before further processing of program instructions is permitted to continue.

Whenever a host instruction is to be executed, numerous checks (herein referred to as "preliminary checks") are routinely made at execution units of the processor to determine whether the instruction will be executed or, alternately, cause an exception. As an example, a store operation is performed by a write of data to an address in the memory (the hardware unit) of the processor. Before allowing the write to proceed, the memory checks for write permissions and for page present.

Other checks of that instruction (herein referred to as "final checks"), not material to the invention, are also made by the hardware unit to which the operation performed is directed after the result of the operation has been committed. That check (or checks) could also result in an exception. As example during the write of data by the processor into the memory unit, an electronic "glitch", though rare, may occur and corrupt the data being written. The memory unit detects the corruption of data and signals the processor of the damaged data. However since the write operation was committed, the written data remains corrupted, creating an error. The invention does not offer a solution to that kind of problem.

If the instruction passes the preliminary checks, the operation specified in the instruction is completed. If any fail, an exception occurs. The processor is then required to resolve the exception before the operation specified in the instruction, the final effect, the write to memory in the preceding example, can be performed.

The foregoing is understood to apply to processors in general and to those processors that process very long instruction word (VLIW) instructions. One example of a VLIW processor disclosed in the patent literature is found in U.S. Pat. No. 5,832,205 to Kelly et al, granted Nov. 3, 1998, entitled, Memory Controller For A Microprocessor For Detecting A Failure of Speculation On The Physical Nature of A Component Being Addressed, assigned to Transmeta Corporation (referred to as the '205 Transmeta patent), the disclosure of which is incorporated herein by reference. Another appears the improved VLIW processor system of Torvalds and Keppel based on the foregoing invention of the '205 Transmeta patent presented in a copending application Ser. No. 09/417358, filed Oct. 13, 1999, entitled Controlling Instruction Translation Using Dynamic Feedback, (herein referred to as the "improved Transmeta computer"), assigned to Transmeta Corporation, the disclosure of which is incorporated herein by reference. As later herein described in greater detail, the present invention has particular application to and improves the operation of the foregoing computers. However, although the present invention has application to the improved Transmeta computer, it should be understood that the invention may also be found to benefit other types of computers as well.

The microprocessor of the '205 Transmeta patent is formed by a combination of a hardware processing portion (called a "morph host"), and an emulating software portion, referred to therein as "code morphing software". Among other things, the code morphing software carries out a significant portion of the functions of processors in software, reducing the hardware required for processing and the greater electrical power that such hardware requires. The '205 Transmeta computer serves as the host system capable of executing software programs designed with an instruction set intended to run on a computer system of different design, the target system, one, such as the X86 type processor, that contains an instruction set unique to the target system, but foreign to the host system.

The present invention addresses the preliminary checks and the exceptions that may result therefrom (the latter herein referred to as a preliminary exception), not the final checks or any exceptions that result from the latter (herein called a final exception, to distinguish from the former exception). Thus, as used herein in connection with the invention, the term preliminary exception refers to a particular kind of out-of-ordinary event that occurs before the operation defined in the instruction is committed; and differs from the other exceptions as may result from the hardware check by that hardware unit of the processor upon actually performing the operation.

Any operation may require preliminary checks. Those checks must execute and generate any needed exceptions before the results of the operation are committed to the machine state. In many prior processors the preliminary checks are performed by the hardware and so are invisible to the software programmer. The hardware may perform the checks before the operation by the hardware, or, in a processor that employs out-of-order execution, may perform the checks concurrently with or even after the bulk of the operation, provided that, with the latter two techniques, the check completes before the operation result is committed.

In the processor of the improved Transmeta computer and in other processors that support speculation, software-managed hardware controls the committing of most machine state. Therefore, with processors of the foregoing type, it is sufficient to speculatively execute the desired operation, provided that the check is executed before the final commit of the result to the machine state.

Some operations, however, may not be speculated. For example, a read of an external device may cause the state of the device to change. The processor of the improved Transmeta computer is unable to roll-back or undo such a read operation. Hence, in the case of the read of an external device, the preliminary check must always precede the read operation. Any failure to perform the preliminary check could potentially result in an unrecoverable error.

In addition, it may sometimes be advantageous to perform the preliminary check as early as possible, so that an exception, as may be generated thereby, may be handled immediately, instead of executing speculated operations and then discarding the result upon occurrence of such exception.

One example of the manner in which preliminary checking is used is a read-modify-write operation, an operation used to increment a register of a peripheral device, external to the processor. Typically, load operations contain implied tests, such as "Readable", and write operations have tests, such as "Writeable". For the read-modify-write to execute correctly, either both the read and the write must occur, or neither should occur. It is an unrecoverable error if only the read occurs. However, an ordinary "load, increment and store" sequence may successfully execute the load, and then fail on the store, as could occur, as an example, if the location is readable, but is not writeable.

As an advantage, the present invention is available for use by the software engineer when a program is being authored, and allows the software engineer to integrate checks within that program. The checks are positioned only at those locations within the program at which the software engineer's judgment dictates, as minimizes impacting processor time unnecessarily.

Accordingly, an object of the present invention is to improve the flexibility and power of a computer, and, particularly, a VLIW computer.

Another object of the invention is to avoid execution of an operation occurring on execution of an instruction by the processor if the operation would produce an unrecoverable error.

A further object of the invention is to avoid the performance of one or more operations specified in an instruction when the performance of one of the operations will produce an error if another of the multiple operations specified in the instruction cannot be successfully completed.

A still further object of the invention is to provide one or more test instructions that serve as software tools enabling a software engineer to selectively incorporate test instructions within a software program being authored logically paired or connected to an instruction (or instructions) of the program which the software engineer believes to be potentially troublesome.

An additional object of the invention is to provide check instructions that mimic instructions of a program, but not the final effect or operation of the mimicked instruction, which enable potential exceptions as might cause an unrecoverable error to be recognized in advance and resolved.

And a still further object of the invention is to provide a better mechanism for minimizing or eliminating errors occurring during processing of instructions.

SUMMARY OF THE INVENTION

In accordance with the foregoing objects, the present invention provides a new instruction, referred to as a check instruction that the software engineer may introduce into a software program. The check instruction mimics an instruction in most important respects, except that the check instruction does not perform, at a minimum, the final operation prescribed in the mimicked instruction. By executing the check instruction, as an example, prior to the associated mimicked instruction, the processor is able to uncover in advance and, ideally, resolve any preliminary exceptions likely to arise upon the assertion of the instruction for execution, without actually performing the final operation called for in the mimicked instruction.

By design the check instruction may be fashioned to exclude not only the final operation, but also some preliminary checks, if, in the software engineer's judgment, the exceptions as would have been detected by the eliminated attributes of the mimicked instruction are known to be of types that are handled by a separate means or are always resolved by the processor and cannot lead to an unrecoverable error.

In essence, the check instruction provides a "dry run" of the instruction, revealing potential problems. Those problems may then be corrected or otherwise handled by the processor in advance, ensuring that the actual instruction, presented for execution subsequently, either next or following one or more intervening operations, is able to complete.

The invention also encompasses a method of verifying that an instruction is capable of performing a final operation prescribed in the instruction without causing a particular type or types of preliminary exceptions by executing an instruction, the check instruction, that mimics the instruction in many or all respects, but excluding at least the final effect or operation called for by the instruction; and determining whether such execution is subject to a preliminary exception. The check instruction may also exclude certain checks (and, hence, any resultant exceptions) that, in the judgment of the software scientist, would not result in an unrecoverable error or for which other mechanisms, the details of which are neither relevant or material to the present invention, are available for successfully handling the particular kind of preliminary exceptions associated with the omitted checks.

Moreover, in accordance with an additional aspect to the method, a detected preliminary exception can be resolved, and, following such resolution, the mimicked instruction may be executed to perform the final operation (or be found subject to a final exception) or, alternatively, where the mimicked instruction is speculatively executed in parallel with a check instruction, detection of a preliminary exception by the check instruction is used to prevent the processor from committing the result of the speculative execution of the mimicked instruction.

The new instruction and method allows the software engineer to include appropriate check instructions for any instructions believed to be troublesome, placing the check instruction in the program routine, preferably in a position preceding any committed "side effects" of the mimicked instruction. The mimicked instruction may be positioned in the software program immediately following the check instruction or following one or more instructions positioned intermediate the check instruction and the mimicked instruction.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF A PREFERRED EMBODIMENT

Figure 1:
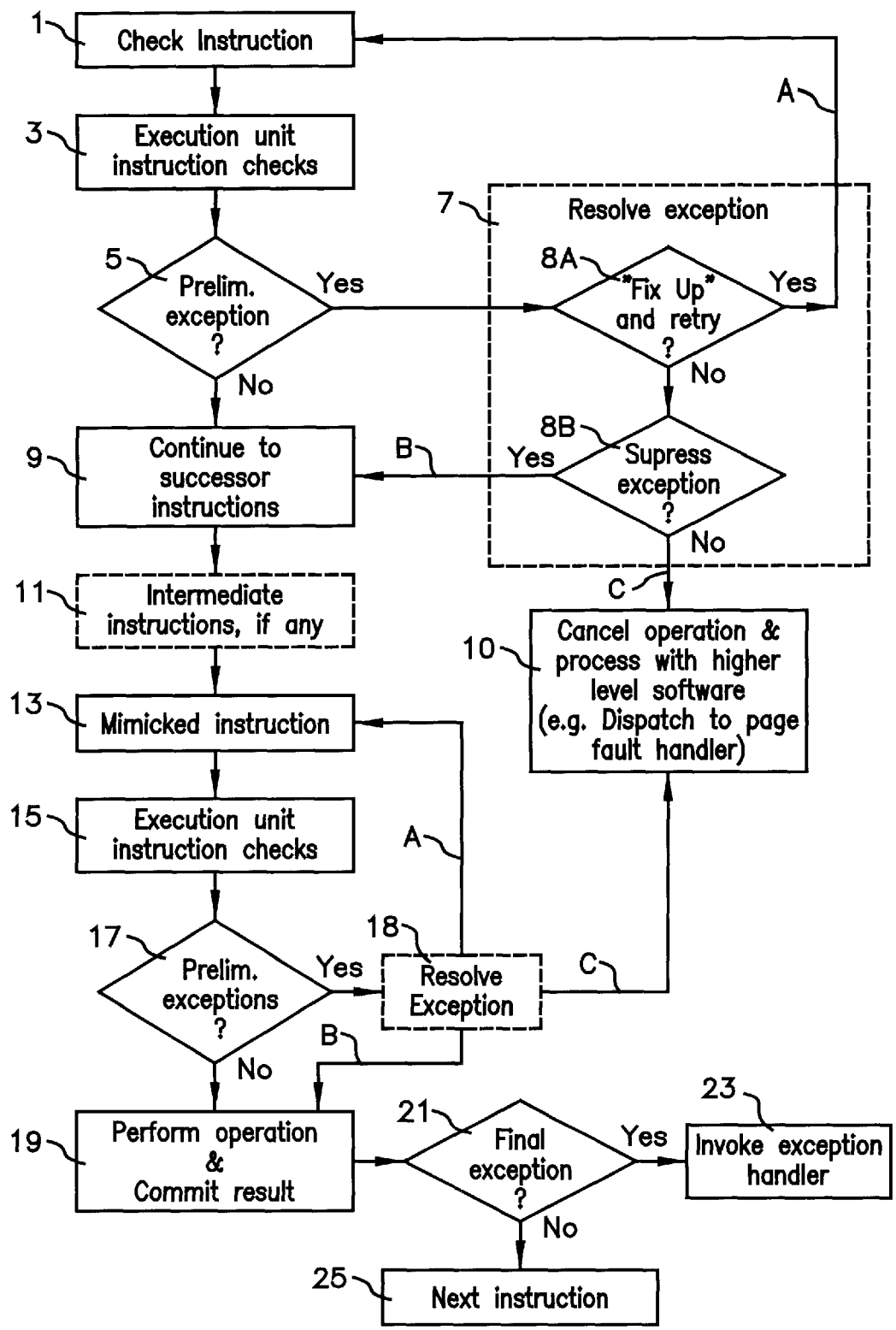
FIG. 1 is a flow chart of an embodiment of the new method.

The improved Transmeta processor includes a number of instructions such as load ("LD") and store ("ST"), which are common to most processors. The processor also includes load left (or high) ("LDL"), load right (or low) ("LDR"), store left ("STL") and store right ("STR") instructions. The latter instructions deal with retrieval or storing, respectively, of the first and second parts of unaligned data, data stored in a segment of memory that bridges a predefined four-byte boundary. Because the data is unaligned, retrieval (or storage) requires a pair of individual operations to complete.

To implement the present invention in the improved Transmeta computer, a corresponding family of check instructions are included in the processor of that computer (for use by the code morphing software of that processor), namely, a load check ("LDCHK"), load check left ("LDCHKL"), load check right ("LDCHKR"), store check ("STCHK"), store check left ("STCHKL")and store check right ("STCHKR").

The LDCHK instruction (and also the LDCHKL and LDCHKR instructions) mimics a load instruction, except that execution thereof does not actually load the data, that is, retrieve the data from memory and place the data in a register, which is the final effect of the mimicked instruction. The STCHK check instruction (and also the STCHKL and STCHR instructions) mimics the store instruction, except that execution thereof does not store any data (that is, write the data into a memory), the final effect of a store operation. Also the STCHK check instruction also does not check for store buffer overflows (a preliminary exception), which is one of the preliminary checks made by the mimicked instruction and omits that attribute of the mimicked instruction. Other embodiments may include the buffer overflow check. In each such check instruction, at a minimum the "final effect" of the mimicked instruction is absent. And, in some, as in the case of the STCHK check instruction, other attributes are also omitted. The foregoing check instructions are tailored to the respective functional units to which the instruction that is to be mimicked is to be placed for execution, such as the memory unit, the floating point unit, and/or any other functional execution unit of the processor.

The processor performs checks for each instruction. The behavior of the checks depends on the current state of the processor and also on the kind of instruction being executed. If the instruction and the processor state are not compatible, the check causes a preliminary exception. As examples, there are the familiar valid, cache miss, debug, target processor memory alignment, read/write and user/supervisor ("U/S") exceptions. Additional exceptions that are perhaps unique to the improved Transmeta computer may be included, such as the host processor memory alignment, alias trap, Abnormal/Normal assumed trap, and a translation ("T"-bit) trap.

Although a preliminary exception may be generated on execution of an instruction, in some circumstances the particular preliminary exception that is generated is of a type that is handled by other means within the processor, the details of which are neither relevant or material to the present invention, such as the store buffer overflow exception earlier mentioned. That circumstance offers little incentive to design and provide a check instruction that checks for that particular exception.

The foregoing T-bit is used to indicate target memory pages for which translations exist. The function and purpose of the T-bit is described in greater detail in the '205 Transmeta patent and also in the copending application for patent Ser. No. 08/702,771 filed Aug. 22, 1996 to Kelly et al, which is also incorporated herein by reference. If an attempt is made to write to the address at which the T-bit is set, an exception is generated, a preliminary exception as herein defined, or, as otherwise stated, causes the store to except.

As an additional example, the further improved '205 Transmeta computer presented In U.S. Pat. No. 5,926,832 granted Jul. 20, 1999 to Wing & Kelly, also incorporated herein by reference, discloses a processor that improves upon the processor of the '205 Transmeta patent by creating an alias for data, which is stored in a register (referred to as the "Alias"memory) located in the processor's alias unit and register file. The Alias memory serves the same function as and is smaller still in size than the familiar cache. Being located in the registers of the integer unit in the processor, data in the Alias memory may be accessed by the processor even more quickly than accessing data from the cache of the processor. Thus copies of the data being used (and that data which is thought likely to be used again in processing a software program) is stored in cache, and a lesser portion still of that data is stored in the Alias memory. When data is retrieved from the Alias memory and given a new value, then, to ensure integrity of processing, the processor must update the same data in each of the cache and in the external memory. The processor generates a preliminary exception for loads and stores to regions that are located in the alias memory.

As those skilled in the art appreciate, the preceding two examples of preliminary exceptions generated, should the bits be in an incorrect state on instruction execution, do not typically produce an exception of the type that causes an unrecoverable error, since those exceptions are dealt with in a way, not here described in detail, that makes the exceptions recoverable. Hence, the foregoing types of preliminary checks do not provide motivation for introduction of the check instruction of the present invention. Even so, as becomes apparent, a check instruction may also be arranged to elicit (or not) such exceptions, should one wish. Thus, should a check instruction be designed to mimic an instruction that includes checks for the two foregoing kinds of preliminary exceptions, the check instruction may also be designed to include those checks. Optionally the check instruction may omit those attributes of the mimicked instruction.

However, those preliminary exceptions that arise with an incorrect state to the A/N bit is characteristic of those exceptions that do cause unrecoverable errors, and, hence, provide a principal motivation to the present invention. The A/N bit identifies whether an access is to memory (normal) or to a memory-mapped input/output (I/O) device (abnormal). An instruction is assumed normal ("Normal Assumed") and has A/N bit of the instruction set. Otherwise the instruction is assumed abnormal ("Abnormal Assumed") and the A/N bit is cleared.

The function and purpose of the A/N bit is described in greater detail in the '205 Transmeta patent. If the bit is found to be Normal Assumed on the preliminary check, while the operation is one that is Abnormal Assumed, an exception is generated. The trap occurs if the instruction Normal Assumed bit disagrees with the translation look aside buffer (TLB) Normal Assumed bit. Typically, operations that store or load from input-output (I/O) space mapped to memory are marked "abnormal". If, however, the A/N bit of the instruction is marked normal, a "normal assumed fault" occurs. That preliminary exception requires resolution.

The X86 processor (target processor) architecture dynamically emulated by the processor of the improved Transmeta computer, defines some operations (instructions) as performing a read-modify-write. Data is read, then modified in the manner specified in the instruction (the result), and the result is written and stored. For some values of that instruction, typically those requiring access to I/O space, the instruction is "atomic". That is, the instruction cannot be executed in part without producing erroneous data.

For such an instruction, design constraints require either the entire instruction executes or it should not be executed at all. In that way, the X86 architecture makes certain that either the read is preempted by a preliminary exception, or, if the read completes, that the write operation at the conclusion of the instruction succeeds. Should a load from input-output space be performed, an unrecoverable processor error occurs if the execution unit is unable to perform the store operation. If the instruction is able to complete the load, but, is then unable to store, the processor is left in an untenable position. A load has been accomplished and some input-output device "knows" the load was accomplished.

Because the load is visible outside the processor, the processor is unable to roll-back the load or skip the store without causing an unrecoverable error. In the foregoing circumstance, the processor of the improved Transmeta computer in running the X86 instruction is unable, because the load has completed, to perform a rollback operation if the store cannot write to input-output space.

However, by first executing a load check (LDCHK) and a store check (STCHK) instruction, mimicking the foregoing read-modify-write instruction, the processor is able to determine whether the mimicked instruction will complete or not without actually performing the load or store operation. If any reason why either load or store cannot complete, that information is determined with the check, and the fault may then be resolved. When the mimicked read-modify-write instruction is then next executed, the processor "knows" the operation will complete.

As an optimization, if the load instruction performs all needed load checks, then it is sometimes sufficient to perform a STCHK and then follow with the load and the store. If the STCHK executes without causing an exception, the store operation is certain to complete, while the implied preliminary checks of the load instruction will cause any needed exceptions prior to performing the load.

Reference is made to the flow chart of FIG. 1, which illustrates the method of employing the check instruction in the execution stage of the processor. In this description, it is understood that the term check instruction is intended as generic in meaning and subsumes load check instructions, store check instructions and the like, earlier described. By design, the software programmer includes an appropriate check instruction into the software routine (program) ahead of the subject instruction that is perceived as troublesome, and which the check instruction is intended to mimic. In that way the processor first executes the check instruction.

Thus, check instruction 1 prescribing a certain operation, is asserted in the execution stage 3. As prescribed in the instruction, the execution unit initiates a check (test) of the instruction, as represented by decisional block 5, by checking the appropriate information bits there within (and/or in other conventional ways). That check may determine that one (or more) of the information bits is in an inappropriate state. If so, the meaning ascribed to an incorrect state is that the instruction will take a preliminary exception, and the instruction cannot execute. In the example of the complex instruction earlier given, the load-modify-store instruction (operation) may be marked normal, while the page protections for memory-mapped input-output regions are marked abnormal. Hence, the check produces a "normal assumed" fault. When a preliminary exception occurs, the processor (program) requires the exception to be resolved, as represented by operational block 7, illustrated in dash lines, before the operation prescribed by the instruction can be performed, if at all.

One procedure at Operation 7 for resolving the exception is represented by a decisional block 8A, at which the processor determines if the exception can be "fixed-up" and, if so, retried. The foregoing process also includes a second decisional block 8B, that is reached should the decision at block 8A be negative, at which juncture the determination is made either to suppress the exception and continue with the program or cancel the operation.

As known to those skilled in the art, the processor software may respond to an exception in many different ways. The particular response may depend on the cause of the exception, the type of exception, which instruction took the exception, and the state of the hardware and software system during processing. The details of such response are not necessary to an understanding of the invention and need not be described in detail. Thus many different responses are possible at this stage.

For example, the processor may determine at 8A to relax a test that is overly conservative, and then retry the check instruction as represented by route A. As example, on a translation look aside buffer miss in the operation of the improved Transmeta computer, to fix-up the exception, the processor may simply reload the translation look aside buffer and try execution again. Alternatively, the processor may determine to suppress the exception and continue with execution, as represented at route B, or the processor may determine to transfer the exception to higher-level software, such as page fault service or the like, for further processing as represented by route C.

One example of a response to fix up an exception that may occur with the improved Transmeta computer involves selecting between a translation procedure and an interpretation procedure in the processor of the improved Transmeta computer. For convenience, that example is presented later in this specification.

Assume that the check for faults at decisional block 5 results in a negative decision. In that event, the check instruction completes. However, as earlier described, the check instruction does not carry out the prescribed final operation. The instruction code of the check instruction omits that operation. Hence, no operation is performed.

Continuing from that negative decision at block 5, as represented at block 9, the process then continues with the assertion of the succeeding instructions in the program for execution. The succeeding instructions may include assertion of any intermediate instructions, represented at block 11, that may be placed in the program to intervene in between the check instruction and the mimicked instruction, and the execution thereof (not separately illustrated) of those intermediate instructions. Following execution of any such intermediate instructions, the process continues with the assertion of the mimicked instruction, represented by block 13.

The mimicked instruction is asserted in the first part of the execution stage, represented at block 15, and is checked for faults as represented at decisional block 17.

If the previously asserted check instruction mimicked this instruction in all respects, excepting (at a minimum) the actual performance of the prescribed operation, and if any preliminary exceptions uncovered with that check instruction were previously resolved or otherwise corrected, logically, no faults will be uncovered at this stage; and the decision at decision at block 17 would necessarily be negative. However, in the preferred embodiment, some items are not checked by the check instruction; and some exceptions on both the check instruction and the mimicked instruction are suppressed, instead of being fixed-up, that is, resolved. In this event the decision at decisional block 17 is affirmative and the processor then is required to resolve the exception, as represented by operational block 18, illustrated in dash lines.

Operational block 18 involves the same procedure as described earlier in connection with operational block 7. First, the procedure determines whether to "fix-up" and retry, as earlier described for decisional block 8A, in which case route A is taken, or to suppress the exception, as earlier described for decisional block 8B, in which cause route B is taken, or to cancel the operation and transfer handling of the exception to higher level software, in which case route C is taken to operational block 10.

In an additional embodiment, later herein described, some "recoverable" faults may be permitted to occur at this stage if they are of a type that can be successfully resolved by the processor.

Assuming either the decision at 17 is negative or the resolution of the exception at block 18 selects route B, the mimicked instruction is then executed by the execution unit, the operation is performed and the effect of the operation is committed, as represented at 19, the result of which (the operation) is directed to a hardware unit within the processor, such as the memory. As is conventional, each hardware unit of the processor performs an additional check (or checks) of the operation required of it as represented at decisional block 21, as example, to determine if the data transmitted in the operation was corrupted, such as during transmission. In most instances, the decision at 21 is negative and the procedure continues to the next instruction in the computer program as represented by block 25. Execution of the computer program continues thereafter by assertion of the next instruction in the computer program being run.

However, in the unlikely event that the instruction fails that hardware check, the decision at 21 is negative and the respective hardware unit generates a (final) exception. To resolve that final exception the processor invokes an exception handler as represented at block 23.

Upon satisfactory resolution of the final exception by the exception handler, if possible, the computer program may continue thereafter by assertion of the next instruction in the computer program being run, as represented at block 25, or, if not possible, halts.

The foregoing embodiment employed a check instruction that mimicked the attributes of an instruction in all respects, excepting the final effect, the operation. It should be realized that a check instruction within the scope of the present invention may also be implemented to perform only some, but not all, of the preliminary checks, in which case the "real" operation, occurring when the mimicked instruction is executed, may still generate exceptions. By design, such use is limited to situations in which any exceptions as may be generated by the real operation are of a kind that do not interfere with successful completion of the operation, such as those earlier referred to as ones that do not produce unrecoverable errors or for which some other means of resolving those exceptions is provided by the processor.

As an example, one might choose to have the STCHK instruction skip "T-bit" traps, provided, however, that, the T-bit traps are either checked (and otherwise resolved) by another mechanism of the processor or the trap must be "preventable" so that a mimicked instruction would never encounter a situation leading to a non-recoverable error. With such a check instruction design, the decision at block 17, could then be affirmative. As should be recognized, however, if the mimicked instruction taking a trap could lead to a non-recoverable error, then one procedure as may be selected is to have the check instruction also test for that exception. Similarly, a store buffer overflow condition is unrecoverable in an "atomic" read-modify-write operation. The processor may prevent (or suppress) that exception or employ another mechanism to deal with it. In the foregoing alternative procedure, the processor resolves the exception, akin to that represented by block 7, and, upon "fixing up" that exception, performs the operation as represented at block 19. Thereafter, the method proceeds in the same manner as earlier described through the steps represented by blocks 21 through 29.

As one appreciates, one check instruction differs from another check instruction, since each mimics a different type of instruction. One check instruction, referred to herein as a load check instruction, may mimic a load operation. Another instruction prescribes a write operation, and a store check instruction mimics that instruction. If it is desired to have check instructions for floating point operations to mimic a floating point instruction, those check instructions will differ in its code structure from the two check instructions previously mentioned. Each check instruction contains essentially all the attributes of the instruction being mimicked which might cause an exception or fault or other undesirable side effect to occur prior to execution of the instruction being mimicked.

Other examples of the usefulness of the check instructions may be considered.

In the improved Transmeta processor, an operation may prescribe the fetch of an address from memory (a load operation) or the operation may prescribe a write of data into a particular address in memory (a store operation). However, not every user is entitled to read from or write to every available address in the processor; some addresses are restricted. The processor executes different code fragments at different privileges; the "system" privilege can configure memory so that any part of it may be accessed, whereas the "user" level is allowed to access only memory prescribed by the system level. Hence access to some addresses is limited to those instructions that execute when the appropriate "user/supervisor" (U/S) bit is set for that page.

Thus, a check is made of the instruction in connection with reads, fetches and write operations to determine if the particular instruction is entitled to access and/or to perform the operation. If the fetch or store operation fails to pass that check, an exception occurs. The processor must then resolve that fault before the instruction can be executed, if at all. Typically, the resolution is an error message and program termination. The appropriate check instruction (of the family of check instructions) and the employment of the described method elicits the fault without executing the mimicked instruction.

Another check made by the execution unit is whether a previous alias has been set up. Alias information indicates whether an alias has (or has not) been established for an address. The Alias information is stored in an Alias unit. If an alias was previously set up and the "aliased" address is used in a load or a store, a fault occurs, and must be resolved. Debug checks occur in similar manner. Debug information, including a memory address, is stored in a Debug unit. If that address is used in a load or store, then a fault occurs and must be resolved. Any of the check instructions elicits the foregoing information.

The PCI bus hardware of the improved Transmeta processor does not implement misaligned references, specifically references (data) that are not aligned (in memory) to a 4 byte boundary. Thus if one has a 2 byte load, located at byte 3 in a "row" (specific byte range) of the load is misaligned, since the data crosses a 4 byte boundary (from byte 3 of one row to byte 0 of the next row). For that circumstance an embodiment of the improved Transmeta processor executes a pair of instructions, earlier noted, load left and load right to retrieve (and assemble) the misaligned (unaligned) data.

A requirement of X86 architecture that is being emulated by the improved Transmeta processor, however, is that in some processing modes, the (misaligned) instruction must take an alignment (check) trap. However, the load left and load right instructions for the Transmeta processor by definition (design) are unable to take an alignment trap. Thus if unprotected load left and load right instructions are used by the Transmeta processor, the processing would sometimes miss the alignment check (required to correctly interpret the X86 instruction and the state of the virtual X86 processor), and that would result in an erroneous interpretation of the target application. To obtain a correct interpretation of the X86 instruction, the procedure is to use a straight load check, LDCHK, because the load instruction, unlike the load left and load right instructions, is able to take an alignment trap.

As further example, a floating point load of a 10 byte value may be implemented in the improved Transmeta processor ("host system") using two loads, an 8 byte load and a 2 byte load. Due to the architecture of the type X86 processor ("target processor") for proper emulation if there is to be a fault, the fault must occur before either of the two loads completes. If the separate bytes are located on different pages of memory, the first load could pass, but the second load could fail. The solution is to add a load check instruction, LDCHK, and execute that check instruction before the floating point load instruction. The load check instruction elicits the fault without performing the operation.

As earlier described the check instruction mimics an instruction in all essential respects, excepting the final operation prescribed in the instruction. However, there may be some preliminary exceptions as could occur for which the programmer may not wish the check instruction to provoke or elicit. If so, that particular attribute is omitted from the check instruction. As example, the improved Transmeta processor contains a store buffer. If too many stores are made without a commit, the store buffer may overflow. For overflow the processor may include a store buffer overflow trap. However, the processor may include some other means for handling that trap or ensuring that the store buffer does not fail and generate a trap. If the processor contains such a means, the judgment may be that no purpose is served by having the check instruction also provoke a check of the space available in the store buffer and generate a fault if the available space is found insufficient. In that circumstance, the particular check may be regarded as redundant and unnecessary. For that reason the preferred embodiment of the STCHK instruction preferably omits the check of the store buffer. Even though the check of store overflow buffer is omitted in the preferred embodiment, it should be recognized that other persons may find it preferable to include such a check in the STCHK check instruction, and remains within the scope of the present invention.

The check instruction method described for the processor system of the Transmeta computer was only in connection with memory instructions, specifically loads and stores. As realized from an understanding of the foregoing description, the use of check instructions is not limited to mimicking only load and store instructions. They can be used for other hardware execution units of the processor, such as the floating point unit. Because the Transmeta processor employs code morphing software to accomplish many functions, and has available the "rollback" procedure to handling many exceptions, the process does not appear to be necessary for other hardware units in the Transmeta system. However, when a load is made from a PCI bus (or other I/O devices) in the computer of the '205 Transmeta patent (and improved versions thereof), there is no ability to roll back to a prior state. Hence, the new method provides a procedure to handle the potential fault.

Moreover, like check instructions may be devised for operations other than loads and stores. As example, the Intel 386 microprocessor system permits incorporation of a co-processor; and as part of the implementation of that co-processor, the instruction set of the microprocessor contains a "move to co-processor register" instruction. That instruction is neither a load or a store, but a way of communicating. Should the '205 Transmeta system be modified to incorporate a co-processor, it is desirable to ensure that the foregoing movement of data to a co-processor will complete to avoid false or partial data. A check instruction adapted to that purpose verifies that the move will complete, or, if not, permit the processor to resolve any fault, before the move instruction is executed.

Earlier in this specification reference was made to the fix up procedure (block 8A) occurring in a translation process versus interpretation process of the improved Transmeta computer. As additional background as may provide a better understanding of the aforementioned procedure in connection with the operation of the invention, such action is described at greater length. The processor of the improved Transmeta computer translates instructions that comprise a target software program "on-the-fly" into instructions of the host instruction set (the host instructions); and then executes the latter instructions. The morph host processor executes the code morphing software which, functioning as either a software "interpreter" or "translator" of target application programs into host processor instructions, which are able to accomplish the purpose of the original application software. For translation, the code morphing software defines a translator, which converts the target instructions to host instructions, and a translation process that translates the target application programs dynamically and optimizes the latter host instructions to provide an optimized translation.

In the translation process, sequences of target instructions spanning known states of the target processor are translated into host instructions and executed. If the sequence of translated instructions execute without raising an exception, the effect of executing the translated host instructions, including update of the registers holding the target state at the point at which the sequence of translated instructions completed, is preserved by a commit instruction (committed to registers and memory) where the translated instructions remain available for later use. If, however, an exception occurs during the execution of the sequence of host instructions, processing stops; and the entire operation may be returned or "rolled-back" to the beginning of the sequence of target instructions at which known state of the target processor exists. It may be noted that such a roll-back avoids what otherwise could result in an exception, including a possible unrecoverable error.

In interpretation, an interpreter accomplishes step-by-step translation of each of the target instructions or sequences of target instructions. The interpreter essentially fetches a target instruction, decodes the instruction, provides a host process to accomplish the purpose of the target instruction, and executes the host process. When the interpreter completes interpreting and executing one target instruction, the interpreter proceeds to the next target instruction. The interpretation process essentially single steps through the interpretation and execution of target instructions. As each target instruction is interpreted and executed, the state of the target processor is brought up to date. Thus, as an example, a complex instruction of a target application, as an example, a load, modify, and store operation (an input-output operation), is interpreted and handled by the interpreter with separate host instructions performed in sequence.

Because the interpreter causes the execution of host processes intended to carry out the purpose of each target instruction, it does not employ the complicated steps necessary for translation of target instructions by the translation process. Interpreted processes typically are not stored and optimization is not carried out as when the translation process is used.

Since translation is a more time consuming procedure for initially handling a target instruction than interpretation, by design the interpreter is used to initially interpret and execute target application instructions. The use of the translation process is undertaken only after some number of executions of any sequence of target instructions have occurred, a number which the processor may decide on-the-fly (e.g., five executions). At that number, the time required for all of the previous interpretations and executions is thought to be equal to the time required to translate (and optimize) the sequence. Consequently, little used instructions utilize the interpreter instead of the translation process software, avoiding the extra processing time required for translation.

The proper service for a preliminary exception may vary in dependence upon the host state of the improved Transmeta computer when an exception occurs. For example, a normal Assumed exception occurring during the translation process produces a rollback in order to avoid mixing speculated operations and committed input-output operations. However, the interpreter does not speculate an operation, so it is safe to suppress the normal assumed trap (exception) when executing an instruction during the interpretation process.

For example, if the decision at decisional block 8A is affirmative when the check instruction is executed, the processor fixes up the exception. If, as example, the exception handler finds that the instruction was being executed by a translation process, the exception handler of the processor may produce a switch-over to the interpretation procedure, and then retry the instruction. If instead the exception handler finds that the interpreter is active, the processor may suppress the exception. Either the foregoing switch-over or the suppression may resolve the preliminary exception. As earlier described, if execution of the check instruction during the translation process causes an exception, the resolution or "fix-up" of the exception will usually result in a roll-back, not an unrecoverable error.

Further, normal or abnormal is indicated in each load or store type instruction. The translation procedure uses abnormal stores and abnormal loads, while the interpreter uses only normal stores and, almost always, uses normal loads. The trap handling for interpretation is different than that for translations, in which the trap is handled by either switching to the interpreter or by generating a new translation. For the interpreter, the trap is handled by "fixing up", that is modifying the reference. Such a fix-up is accomplished by locking out interrupts for the remainder of the execution of the target instruction and dynamically creating a new host instruction that is like the instruction that was trapped, but which, instead, uses an abnormal reference. Alternatively, in other, more rare instances, some bytes of an instruction fetch may ignore the normal/abnormal attribute altogether.

One may characterize the foregoing mode of operation of the processor more simply with a statement to the effect that the interpreter effectively disregards whether the A/N bit is marked normal or abnormal and interprets all operations as abnormal. By switching to (or, as the case may be, remaining in) the interpreter, an exception may be generated when the instruction is executed and that exception, by design, will usually be suppressed, and the operation will be carried out. The foregoing is a resolution to the exception of a Normal assumed fault.

Once the exception handler resolves the exception, control is returned to the program and the program continues as generally represented in block 9 and advances to following instructions, as would include the instruction that was mimicked by the check instruction.

As those skilled in the art realize from the preceding description, an alternative to the foregoing check instruction procedure is to provide a family of instructions that incorporate all necessary checks, as an example a "load and check for store" instruction. In general and as further examples, that alternative approach may require a "load left and check load right", "load left and check load", "load left and check load and store" instructions, and so on. Therefore, such an approach leads to great complexity in the instruction set and in the hardware, which is more expensive and seemingly less practical. The explicit "check" instructions provided by the present invention, however, provide simple building blocks that may be implemented with little hardware overhead, requiring only a minimal increase in hardware complexity, and can be tailored for use in a wide variety of circumstances.

A computer program typically contains a large number of instructions. In authoring a program the programmer is able to foresee potential problems as might occur in the execution of one or more of the instructions. In accordance with the invention, the programmer may make use of the check instruction method and insert the appropriate check instruction in the program in front of the instruction that gives rise to such concern.

The foregoing method is performed by the processor, and some of the steps were described in terms of the functional units of the processor and/or the computer in which the processor is resident. Since the components of the processor (and computer) are either known or are adequately described in the cited patents and pending applications, it is not necessary to illustrate them in this application. However, as those skilled in the art appreciate, the present invention requires slight modification of the processors instruction decode logic.

In the prior processor, the decode logic simply decoded an instruction, since a check instruction as described herein was non-existent. In accordance with the invention, thus, the decode logic of the processor is modified to add an additional level of decisional logic which determines whether the instruction presented is a check instruction or a "normal" instruction, such as a mimicked instruction. If determined to be a check instruction, the processor, as earlier described, does not carry out at least the final effect or operation found in the normal instruction.

The term attribute was used herein in the context of the attribute of an instruction to refer to some information (to be checked) that is explicitly found within the instruction. Some information, however, as the preceding description makes clear is not explicitly found in the instruction but is discovered in the processor state indirectly. As an example, an instruction may contain a register number, which leads to an address, and it is the address (an attribute in a sense) which is responsible for the exception occurring in the check. More specifically, an Alias trap is signaled by the alias unit, based on the translation look aside buffer contents, the translation look aside buffer contents being subscripted by an address found in a register, and the instruction contains only the register number. For convenience, such indirectly "acquired" information obtained on execution of an instruction is referred to herein as an acquired attribute of the instruction.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A computer program comprising:
    an instruction, said instruction prescribing a processor operation; and
    a check instruction, said check instruction mimicking said instruction but incapable of carrying out at least some part of said processor operation.

2. The method of verifying that an instruction is capable of performing a final operation prescribed in said instruction without causing a preliminary exception, said final operation including one or more effects, comprising the steps of:
    executing an instruction that mimics said instruction excepting at least said final operation; and
    determining whether a preliminary exception arises.

3. The method of verifying that a processor operation prescribed in an instruction is capable of execution by the respective instruction execution units of the processor responsible for execution of said instruction without causing a preliminary exception, comprising the steps of:
    executing a check instruction, said check instruction comprising any attributes and acquired attributes contained in said instruction, excepting therefrom at least said operation, whereby said check instruction mimics a part of said instruction without producing an operation; and
    determining whether a preliminary exception occurs when said check instruction is being executed by said execution unit.

4. The method set forth in claim 3, further comprising the steps of:
    determining the nature of any preliminary exception that arises;
    resolving said preliminary exception; and
    executing said instruction.

5. The method as defined in claim 3, wherein said step of executing a check instruction further comprises the step of executing said check instruction before execution of said instruction.

6. The method set forth in claim 3, wherein said step of executing a check instruction further comprises the steps of:
    identifying suspect instructions that prescribe operations, which, if not fully performed, pose a hazard to correct processing;
    selecting check instructions for said suspect instructions;
    associating each of said suspect instructions with at least one respective selected check instruction, whereby each said suspect instruction or group of instructions has a respective check instruction associated therewith;
    placing said check instruction and said associated suspect instruction in serial order for execution with said respective check ahead of said suspect instruction, directly, or separated therefrom by one or more intervening instructions.

7. The method of processing an instruction to execute an operation, comprising the steps of:
    determining whether any of the respective instruction execution units of the processor responsible for execution of said instruction will generate a fault signal upon presentation of said instruction for execution and producing a positive or negative determination;
    said step of determining, including the steps of:
        asserting a check instruction in at least one of said execution units for execution ahead of said instruction, said check instruction comprising attributes prescribed in and acquired by said instruction, excepting therefrom at least said operation, whereby said check instruction mimics a part of said instruction without performing an operation;
        determining whether any of said execution units generate a fault signal when said check instruction is presented to said execution units for execution; and,
        if any of said execution units do not generate a fault signal, producing a negative determination, and, if any of said execution units generates a fault signal, producing a positive determination;
    executing said instruction when said determination is negative, whereby said operation is completed without generation of a fault; or
    resolving the fault when said determination is positive, and, following resolution of said fault, executing said instruction, whereby said operation is completed without generation of a fault.

8. In a microprocessor containing a plurality of individual instructions, the improvement therein wherein a portion of said individual instructions comprise: check instructions, each check instruction being associated with at least one of the remaining ones of said plurality of individual instructions and mimicking said associated individual instruction in multiple respects, excluding at least the final effect of said associated individual instruction; and means for asserting each of said check instructions for execution prior to said associated one of said individual instructions.

9. The invention as defined in claim 8, wherein said individual instructions include: a first instruction defining a load operation; and wherein said plurality of check instructions include: a load check instruction, said load check instruction containing the essential attributes of said first instruction excepting said load operation; and wherein said computer program defines an order of execution for said load check instruction and said first instruction wherein said load check instruction precedes said first instruction in said order.

10. The invention as defined in claim 9, wherein said individual instructions further include: a second instruction defining a store operation; and wherein said plurality of check instructions include: a store check instruction, said store check instruction containing the essential attributes of said second instruction excepting said store operation; and wherein said computer program defines an order of execution for said store check instruction and said second instruction wherein said store check instruction precedes said second instruction in said order.

11. The invention as defined in claim 8, wherein said individual instructions further include: a second instruction defining a store operation; and wherein said plurality of check instructions include: a store check instruction, said store check instruction containing the essential attributes of said second instruction excepting said store operation; and wherein said computer program defines an order of execution for said store check instruction and said second instruction wherein said store check instruction precedes said second instruction in said order.

12. The invention as defined in claim 8, wherein said plurality of individual instructions further include: a lesser plurality of instructions each defining a respective one of a plurality of processor operations; and wherein said plurality of check instructions include: a check instruction associated with each of said lesser plurality of instructions, each said check instruction containing the essential attributes of a respective one of said lesser plurality of instructions, excepting the respective processor operation therein defined; and wherein said computer program defines an order of execution for said check instructions and said instructions wherein each said check instruction precedes the associated one of said lesser plurality of instructions in said order of execution.

13. A computer processor for executing instructions, comprising:

decode logic for decoding instructions; and means for executing instructions in accordance with information obtained by said decode logic; and said decode logic including means for determining if an instruction presented for execution comprises a check instruction.

* * * * *